United States Patent
Ho et al.

(10) Patent No.: US 9,836,278 B2
(45) Date of Patent: Dec. 5, 2017

(54) FLOATING POINT COMPUTATION APPARATUS AND METHOD

(71) Applicant: Huawei Technologies Co., Ltd., Shenzhen (CN)

(72) Inventors: Huong Ho, Woodlawn (CA); Michel Kafrouni, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 14/726,246

(22) Filed: May 29, 2015

(65) Prior Publication Data

US 2016/0350073 A1 Dec. 1, 2016

(51) Int. Cl.
*G06F 7/48* (2006.01)
*G06F 7/485* (2006.01)

(52) U.S. Cl.
CPC .................................. *G06F 7/485* (2013.01)

(58) Field of Classification Search
None
See application file for complete search history.

(56) References Cited

U.S. PATENT DOCUMENTS

| | | | |
|---|---|---|---|
| 5,235,537 A | 8/1993 | McWhirter et al. | |
| 5,339,447 A | 8/1994 | Balmer | |
| 6,591,286 B1 * | 7/2003 | Lu | G06F 7/5055 |
| | | | 708/672 |
| 6,665,698 B1 | 12/2003 | Tsai et al. | |
| 7,447,727 B2 * | 11/2008 | Langsdorf | G06F 7/5055 |
| | | | 708/672 |
| 2003/0061253 A1 | 3/2003 | Evans | |
| 2004/0225705 A1 | 11/2004 | Rumynin | |
| 2004/0237003 A1 | 11/2004 | Adkisson | |
| 2005/0047527 A1 | 3/2005 | Denk | |
| 2006/0179345 A1 | 8/2006 | Subbarao | |
| 2012/0239719 A1 | 9/2012 | Rigge | |

FOREIGN PATENT DOCUMENTS

| | | |
|---|---|---|
| CN | 1591824 A | 3/2005 |
| CN | 102707931 A | 10/2012 |
| JP | 2001036348 A | 2/2001 |

OTHER PUBLICATIONS

Dimitrakopoulous, G., "Low-Power Leading-Zero Counting and Anticipation Logic for High-Speeed Floating Point Units," IEEE Transactions on Very Large Scale Integration (VLSI) Systems, vol. 16, No. 7, Jul. 2008, pp. 837-850.

Grushin, A. I., et al., "Fast Result Normalization in FP Adder," Electrical and Electronics Engineers in Israel, Dec. 2008, pp. 152-156.

* cited by examiner

*Primary Examiner* — Michael D Yaary
(74) *Attorney, Agent, or Firm* — Slater Matsil, LLP

(57) ABSTRACT

A method comprises receiving a first N-bit unsigned number and a second N-bit unsigned number, receiving a control signal indicating a m-bit shifting operation and processing the first N-bit unsigned number, the second N-bit unsigned number and the control signal in an add-and-shift apparatus, wherein an addition/subtraction operation and the m-bit shifting operation are performed in parallel in the add-and-shift apparatus.

20 Claims, 9 Drawing Sheets

FLOATING POINT COMPUTATION APPARATUS AND METHOD

TECHNICAL FIELD

The present invention relates to central processing unit and digital signal processor designs, and, in particular embodiments, to a floating point addition and subtraction apparatus and method.

BACKGROUND

Floating-point arithmetic operations are widely used in digital applications such as Central Process Unit (CPU), Digital Signal Processor (DSP) and/or the like. A real number can be written in floating-point representation. For example, a real number 'a' can be expressed by the following equation:

$$a = (-1)^S \cdot M_a \cdot b^q \quad (1)$$

where S is the sign of the real number 'a'; Ma is the mantissa of the real number 'a'; b is the base (2 or 10) of the real number and q is the exponent of the real number 'a'.

Floating-point arithmetic operations such as an addition/subtraction process may be carried out by a variety of logic circuits. An addition/subtraction process may include computing the exponent difference of two real numbers, aligning these two real numbers based upon the exponent difference (e.g., shifting the real number with the smaller exponent to the right), adding/subtracting the aligned mantissas, normalizing the result by shifting the result to the left a number of positions equal to the number of the leading zeros and rounding the result in accordance with a specified rounding mode.

SUMMARY OF THE INVENTION

These and other problems are generally solved or circumvented, and technical advantages are generally achieved, by preferred embodiments of the present invention which provide an apparatus and method for computing two binary numbers such as an addition operation, a subtraction operation and/or the like.

In accordance with an embodiment, an apparatus comprises an input block configured to receive a first N-bit unsigned number and a second N-bit unsigned number, wherein the input block comprises N propagate and generate cells.

The apparatus further comprises a plurality of calculation cells arranged in rows and columns, wherein the number of the columns is equal to N and the number of the rows is equal to $\log_2(N)$, wherein each row has N cells and has an index ri, and wherein a variable d is equal to $2^{ri}$, and wherein each calculation cell has three groups of inputs connected to three cells in a preceding row, and wherein a first group of inputs are connected to outputs of a first calculation cell in the preceding row and vertically aligned with the calculation cell, a second group of inputs are connected to outputs of a second calculation cell that is d cells away from the first calculation cell and a third group of inputs are connected to outputs of a third calculation cell that is 2d cells away from the first calculation cell and an output block comprising a plurality of XOR gates.

In accordance with another embodiment, a system comprises an input block configured to receive a first N-bit unsigned number, a second N-bit unsigned number and a control signal, wherein the input block comprises N propagate and generate cells, a plurality of calculation cells arranged in rows and columns and coupled to the input block, wherein the calculation cells are configured to perform an add operation and a shifting operation based upon the control signal, and the add operation and the shifting operation are applied in parallel to the first N-bit unsigned number and the second N-bit unsigned number and an output block comprising a plurality of XOR gates coupled to a last row of the plurality of calculation cells.

In accordance with yet another embodiment, a method comprises receiving a first N-bit unsigned number and a second N-bit unsigned number, receiving a control signal indicating a m-bit shifting operation and processing the first N-bit unsigned number, the second N-bit unsigned number and the control signal in an add-and-shift apparatus, wherein an addition or subtraction operation and the m-bit shifting operation are performed in parallel in the add-and-shift apparatus.

An advantage of a preferred embodiment of the present invention is to achieve fast computation of two binary numbers through an add-and-shift apparatus having $(3 \cdot \log_2(N)+4)$ levels of 2-input NAND gates. Such an apparatus helps to reduce the logic gate delay, thereby improving the efficiency of floating-point arithmetic operations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an addition/subtraction apparatus in digital circuit applications. The invention may also be applied, however, to a variety of floating-point arithmetic operations in applications such as Central Processing Unit (CPU), Digital Signal Processing (DSP) and/or the like. Hereinafter, various embodiments will be explained in detail with reference to the accompanying drawings.

Figure 1:
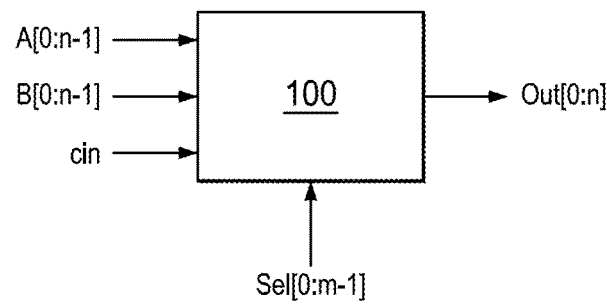
FIG. 1 illustrates a block diagram an add-and-shift apparatus in accordance with various embodiments of the present disclosure.

FIG. 1 illustrates a block diagram an add-and-shift apparatus in accordance with various embodiments of the present disclosure. The add-and-shift apparatus 100 has four inputs and an output as shown in FIG. 1. The first input A is configured to receive a first unsigned number in binary format. In some embodiments, the first unsigned number has n bits ranging from bit 0 to bit (n−1). The binary representation of the first unsigned number is A[0:n−1]. The second input B is configured to receive a second unsigned number in binary format. The second unsigned number has n bits ranging from bit 0 to bit (n−1). The binary representation of the second unsigned number is B[0:n−1]. In some embodiments, the first unsigned number and the second unsigned number are aligned matissas to be added or subtracted.

The third input is configured to receive an initial carry cin indicating addition and subtraction operations. More particularly, cin is set to 0 in binary notation when an addition operation is performed on the first unsigned number and the second unsigned number. On the other hand, cin is set to 1 in binary notation when a subtraction operation is performed on the first unsigned number and the second unsigned number. The fourth input is configured to receive a control signal Sel.

The control signal Sel is employed to provide the shifting value in the addition/subtraction operations. In some embodiments, the shifting value is generated by a Leading Zero Anticipation/Leading Zero Detection (LZA/LZD) unit. The LZA/LZD unit may be part of a floating point (FP) arithmetic circuit including the add-and-shift apparatus 100. The operation principles of the LZA/LZD unit are well known in the art, and hence are not discussed in further detail herein to avoid unnecessary repetition.

The control signal Sel has m bits ranging from bit 0 to bit (m-1). In some embodiments, m is given by the following equation:

$$m = \log_2(n) \quad (2)$$

where n is the number of bits of the first unsigned number.

The output of the add-and-shift apparatus 100 carries out the addition or subtraction of the two n-bit unsigned numbers. The output of the add-and-shift apparatus 100 generates a number in binary format. The output Out has (n+1) bits ranging from bit 0 to bit n. Based upon the control signal Sel, the output Out[0:n] has been normalized by shifting left to eliminate the leading zeros. The shifting operations and the addition/subtraction operations are performed in parallel in the add-and-shift apparatus 100. The longest delay path of the add-and-shift apparatus 100 is equal to (3·m+4) levels of 2-input NAND gates.

The add-and-shift apparatus 100 comprises one row of Propagate (P) and Generate (G) modules and m rows of Propagate and Shift (PS) units and Generate and Shift (GS) units. The PS units and GS units are not only used to carry out the addition/subtraction operations, but also used to enable the shifting operations. More particularly, the shifting operations are performed in parallel with the addition/subtraction operations. The detailed operation principles and schematic diagrams of the add-and-shift apparatus 100 will be described below in detail with respect to FIGS. 2-13.

Figure 2:
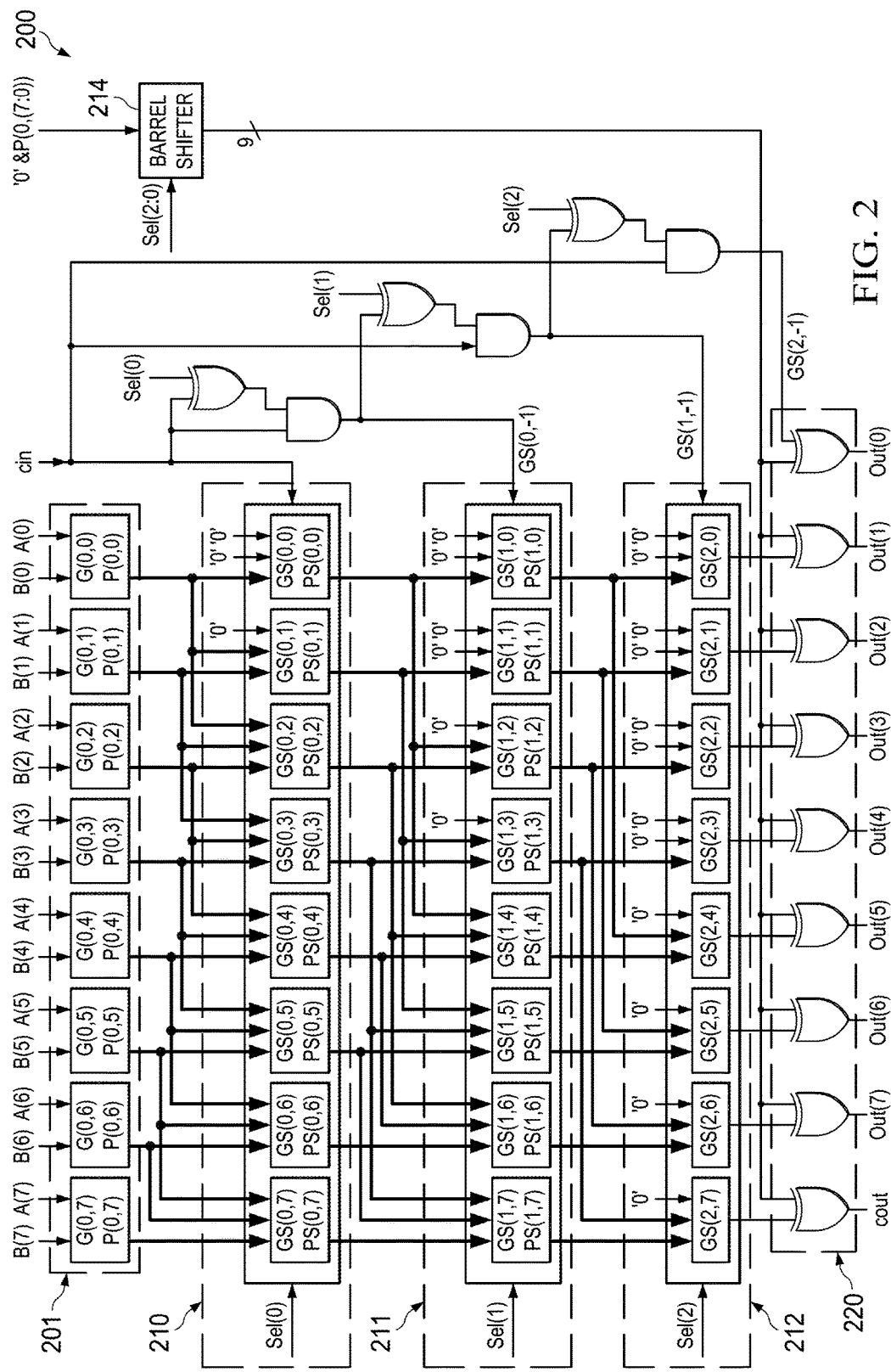
FIG. 2 illustrates a block diagram an 8-bit add-and-shift apparatus in accordance with various embodiments of the present disclosure.

FIG. 2 illustrates a block diagram an 8-bit add-and-shift apparatus in accordance with various embodiments of the present disclosure. The 8-bit add-and-shift apparatus 200 receives two unsigned 8-bit numbers (e.g., A and B shown in FIG. 2) and generates a 9-bit output number Out. The 8-bit add-and-shift apparatus 200 includes four rows, namely row 201, row 210, row 211 and row 212. As shown in FIG. 2, these four rows include a plurality of cells. These cells are arranged in columns and rows. The index of the columns shown in FIG. 2 ranges from 0 to 7.

Row 201 includes eight Propagate and Generate cells, each of which comprises two inputs coupled to two corresponding bits of the two unsigned 8-bit numbers. For example, the fourth cell of row 201 receives two input bits A(3) and B(3) respectively and generates G(0,3) and P(0,3). The detailed schematic diagram of the Propagate and Generate cells will be described below with respect to FIG. 3.

Row 210 includes eight cells, each of which is vertically aligned with a corresponding Propagate and Generate cell in row 201. The corresponding Propagate and Generate cell in row 201 is referred to as the preceding cell because it is placed above the cell in row 210 and vertically aligned with the cell in row 210. For example, the fourth cell of row 201 is the preceding cell of the fourth cell (cell GS(0,3) and PS(0,3)) of row 210.

Each cell of row 210 includes a Propagate and Shift (PS) unit and a Generate and Shift (GS) unit. The schematic diagram of the PS units and GS units of row 210 will be described below in detail with respect to FIG. 5 and FIG. 7 respectively.

Each cell of row 210 has three inputs connected to the outputs of the cells of row 201. A first input of a cell (e.g., cell including GS(0,7) and PS(0,7)) is connected to the output of the preceding cell (e.g., cell including G(0,7) and P(0,7)). The second input of the cell (e.g., cell including GS(0,7) and PS(0,7)) is connected to the output of a cell immediately next to the preceding cell. In other words, the second input of the cell is connected to the output of a cell (e.g., cell including G(0,6) and P(0,6)) that is one cell away from the preceding cell. The third input of the cell (e.g., cell including GS(0,7) and PS(0,7)) is connected to the output of a cell (e.g., cell including G(0,5) and P(0,5)) that is two cells away from the preceding cell.

In sum, each cell of row 210 is connected to its preceding cell in row 201, a first cell in row 201 having d positions away from the preceding cell and a second cell in row 201 having 2d positions away from the preceding cell. In some embodiments, d is equal to $2^{ri}$, where ri is the row index of row 210. Row 210 has a row index of 0. As a result, in row 210, each cell has inputs connected to its preceding cell, a first cell having one cell away from the preceding cell and a second cell having two cells away from the preceding cell. According to this connection principle, some inputs of the first cell and second cell of row 210 are connected to cells that do not exist. These inputs of the first cell and second cell of row 210 are set to 0 as shown in FIG. 2.

Row 211 includes eight cells, each of which is vertically aligned with a corresponding cell in row 210. The corresponding cell in row 210 is referred to as the preceding cell because it is placed above the cell in row 211 and vertically aligned with the cell in row 211. Each cell of row 211 includes a PS unit and a GS unit. The schematic diagram of the PS units and GS units of row 211 will be described below in detail with respect to FIG. 4 and FIG. 6 respectively.

Row 211 has a row index of 1. As a result, d of row 211 is equal to 2. As shown in FIG. 2, each cell of row 211 has three inputs. A first input of a cell (e.g., cell including GS(1,7) and PS(1,7)) is connected to the output of the preceding cell (e.g., cell including GS(0,7) and PS(0,7)) in row 210. The second input of the cell (e.g., cell including GS(1,7) and PS(1,7)) is connected to the output of a cell (e.g., cell including GS(0,5) and PS(0,5)) that is two cells (d=2) away from the preceding cell(e.g., cell including GS(0,7) and PS(0,7)). The third input of the cell (e.g., cell including GS(1,7) and PS(1,7)) is connected to the output of a cell (e.g., cell including GS(0,3) and PS(0,3)) that is four cells (2d=4) away from the preceding cell. Some inputs of the cells in row 211 are connected to cells that do not exist. These inputs are set to 0 as shown in FIG. 2.

Row 212 includes eight cells, each of which is vertically aligned with a corresponding cell in row 211. The corresponding cell in row 211 is referred to as the preceding cell. Each cell of row 212 includes a GS unit. The schematic diagram of the GS units of row 212 will be described below in detail with respect to FIG. 6.

Row 212 has a row index of 2. As a result, d of row 211 is equal to 4. As shown in FIG. 2, each cell of row 212 has three inputs. A first input of a cell (e.g., cell including GS(2,7)) is connected to the output of the preceding cell (e.g., cell including GS(1,7) and PS(1,7)) in row 211. The second input of the cell (e.g., cell including GS(2,7)) is connected to the output of a cell (e.g., cell including GS(1,3) and PS(1,3)) that is four cells (d=4) away from the preceding cell (e.g., cell including GS(1,7) and PS(1,7)). The third input of the cell (e.g., cell including GS(2,7)) is connected to the output of a cell that is eight cells (2d=8) away from the preceding cell. Since the cell connected to the third input does not exist, the third input of the cell including GS(2,7) is set to 0 as shown in FIG. 2. Likewise, some inputs of the other cells in row 212 are connected to cells that do not exist. These inputs in row 212 are set to 0 as shown in FIG. 2.

The 8-bit add-and-shift apparatus 200 further comprises an output block 220. The output block 220 comprises nine exclusive OR (XOR) gates. As shown in FIG. 2, a first XOR gate has a first input connected to an output of a barrel shifter 214 and a second input connected to GS(2,-1). As shown in FIG. 2, GS(2,-1) is generated by a logic circuit comprising a plurality of logic gates. The logic gates receive an initial carry cin indicating addition and subtraction operations and 3 bits of the control signal Sel (e.g., Sel(0), Sel(1) and Sel(2)) indicating the shifting value in the addition/subtraction operations, and generate GS(0,-1), GS(1,-1) and GS(2,-1) as shown in FIG. 2.

The other XOR gates of the output block 220 have a first input connected to an output of a preceding cell in row 212 and a second input connected to a corresponding bit of the output of the barrel shifter 214. The detailed schematic diagrams of the output block 220 and barrel shifter 214 will be described below with respect to FIGS. 12-13.

It should be noted that FIG. 2 illustrates only eight cells in each row that may include hundreds of such cells. The number of cells in each row illustrated herein is limited solely for the purpose of clearly illustrating the inventive aspects of the various embodiments. The various embodiment of the present application are not limited to any specific number of cells in each row.

Furthermore, the diagram shown in FIG. 2 is merely an example, which should not unduly limit the scope of the claims. One of ordinary skill in the art would recognize many variations, alternatives, and modifications. For example, the 8-bit add-and-shift apparatus 200 illustrated in FIG. 2 is simply one embodiment and that other configurations for an add-and-shift apparatus, including an arithmetic operation with a different number of bits, can be employed.

Figure 3:
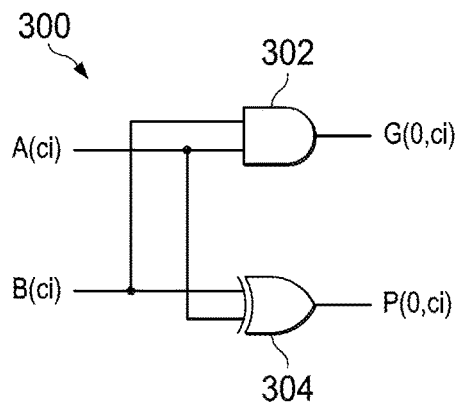
FIG. 3 illustrates a schematic diagram of the Propagate and Generate cells shown in FIG. 2 in accordance with various embodiments of the present disclosure.

FIG. 3 illustrates a schematic diagram of the Propagate and Generate cells shown in FIG. 2 in accordance with various embodiments of the present disclosure. The Propagate and Generate cell 300 includes an AND gate 302 and a XOR gate 304. The Propagate and Generate cell 300 has a first input connected to A(ci) where ci represents a bit of the first unsigned number A, and a second input connected to B(ci), which is a corresponding bit of the second unsigned number B. Both A(ci) and B(ci) are fed into the AND gate 302. The output of the AND gate 302 is G(0,ci). Likewise, Both A(ci) and B(ci) are fed into the XOR gate 304. The output of the XOR gate 304 is P(0,ci).

Figure 4:
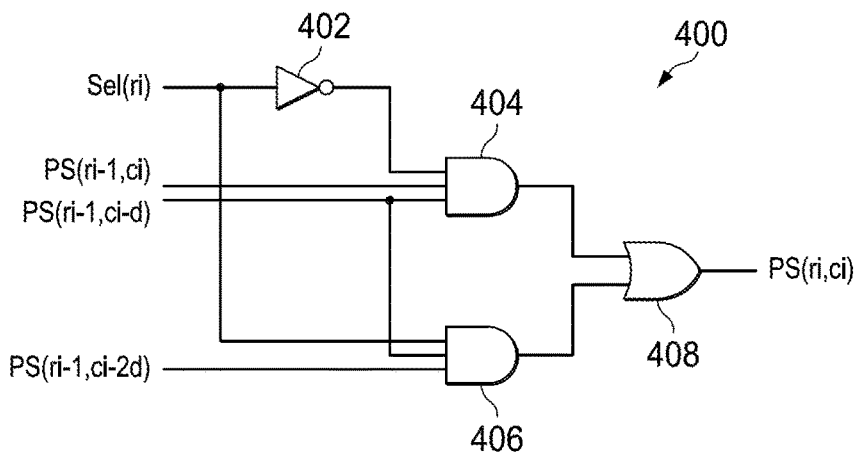
FIG. 4 illustrates a schematic diagram of the PS units shown in FIG. 2 in accordance with various embodiments of the present disclosure.

FIG. 4 illustrates a schematic diagram of the PS units shown in FIG. 2 in accordance with various embodiments of the present disclosure. The PS unit 400 a NOT gate 402, a first AND gate 404, a second AND gate 406 and an OR gate 408.

The PS unit 400 has four inputs, namely Sel(ri), PS(ri-1,ci), PS(ri-1,ci-d) and PS(ri-1,ci-2d) where ri represents the index of the row where the PS unit is located; ci represents the index of the column where the PS unit is located; d is a variable. In some embodiments, d is given by the following equation:

$$d=2^{ri} \quad (3)$$

As shown in FIG. 4, the first AND gate 404 has three inputs. The first input of the first AND gate 404 is connected to Sel(ri) through the NOT gate 402. The second input and third input of the first AND gate 404 are connected to PS(ri-1,ci) and PS(ri-1,ci-d) respectively. The second AND gate 406 has three inputs. The first input of the second AND gate 406 is connected to Sel(ri). The second input and third input of the second AND gate 406 are connected to PS(ri-1,ci-d) and PS(ri-1,ci-2d) respectively. The outputs of the first AND gate 404 and the second AND gate 406 are fed into the OR gate 408. The output of the OR gate 408 generates PS(ri,ci).

Figure 5:
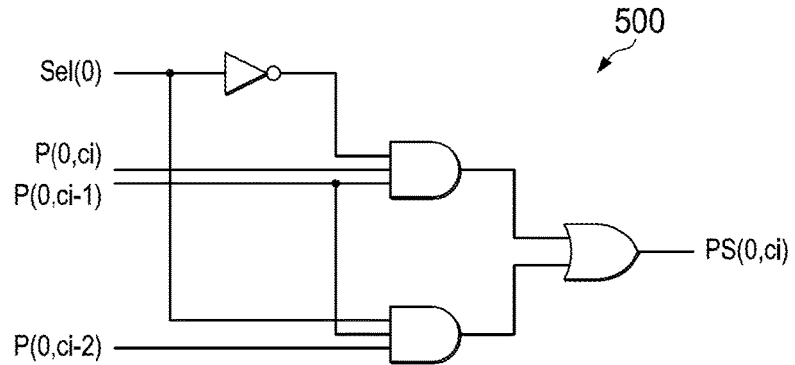
FIG. 5 illustrates a schematic diagram of the PS units in the first row of the 8-bit add-and-shift apparatus shown in FIG. 2 in accordance with various embodiments of the present disclosure.

FIG. 5 illustrates a schematic diagram of the PS units in the first row of the 8-bit add-and-shift apparatus shown in FIG. 2 in accordance with various embodiments of the present disclosure. The schematic diagram of the PS unit 500 is similar to that of the PS unit 400 shown in FIG. 4 except that the inputs of PS unit 500 are connected to P(0,ci), P(0,ci-1) and P(0,ci-2) respectively. It should be noted that P(0,ci), P(0,ci-1) and P(0,ci-2) are generated by the Propagate and Generate cells shown in FIG. 3.

Figure 6:
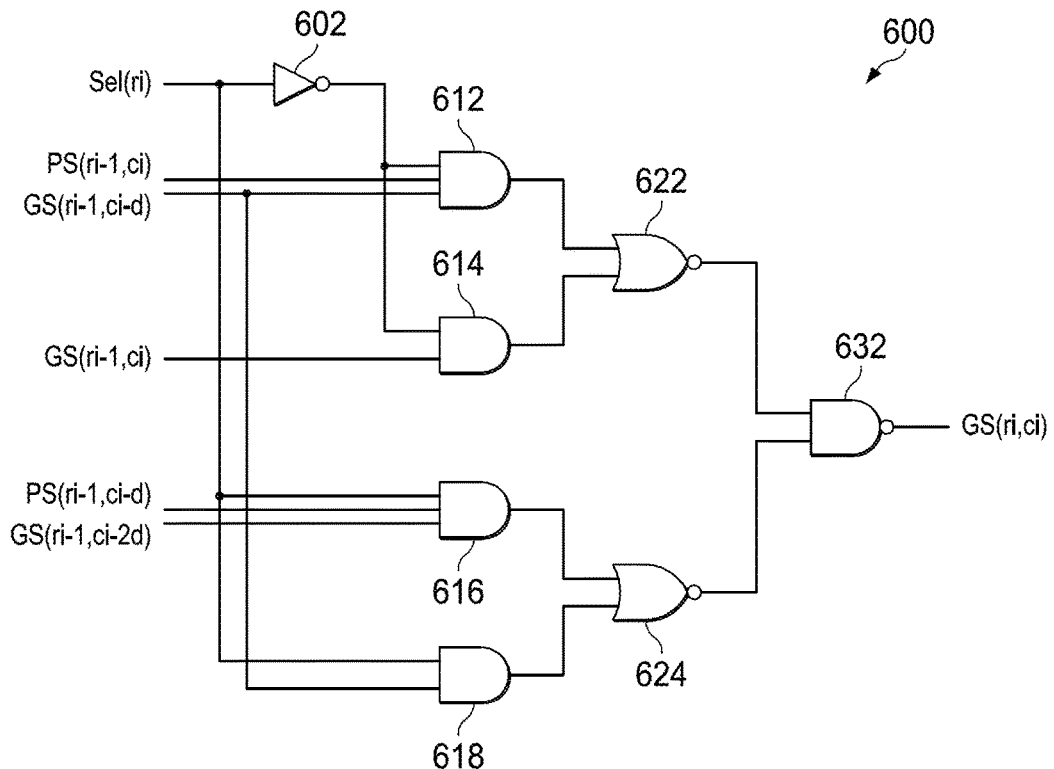
FIG. 6 illustrates a schematic diagram of the GS units shown in FIG. 2 in accordance with various embodiments of the present disclosure.

FIG. 6 illustrates a schematic diagram of the GS units shown in FIG. 2 in accordance with various embodiments of the present disclosure. The GS unit 600 includes a NOT gate 602, AND gates 612, 614, 616 and 618, NOR gates 622 and 624, and a NAND gate 632. The GS unit 600 has six inputs, namely Sel(ri), PS(ri-1,ci), GS(ri-1,ci-d), GS(ri-1,ci), PS(ri-1,ci-d) and GS(ri-1,ci-2d).

As shown in FIG. 6, the first AND gate 612 has three inputs. The first input of the first AND gate 612 is connected to Sel(ri) through the NOT gate 602. The second input and third input of the first AND gate 612 are connected to PS(ri-1,ci) and GS(ri-1,ci-d) respectively. The second AND gate 614 has two inputs. The first input of the second AND gate 614 is connected to Sel(ri) through the NOT gate 602. The second input of the second AND gate 614 is connected to GS (ri-1,ci).

The third AND gate 616 has three inputs. The first input of the third AND gate 616 is connected to Sel(ri). The second input and third input of the third AND gate 616 are connected to PS(ri-1,ci-d) and GS(ri-1,ci-2d) respectively. The fourth AND gate 618 has two inputs. The first input of the fourth AND gate 618 is connected to Sel(ri). The second input of the fourth AND gate 618 is connected to GS(ri-1,ci-d).

The outputs of the first AND gate 612 and the second AND gate 614 are fed into the first NOR gate 622. The outputs of the third AND gate 616 and the fourth AND gate 618 are fed into the second NOR gate 624. The NAND gate 632 has two inputs connected to the outputs of the first NOR gate 622 and the second NOR gate 624 respectively. The output of the NAND gate 632 is GS(ri,ci).

Figure 7:
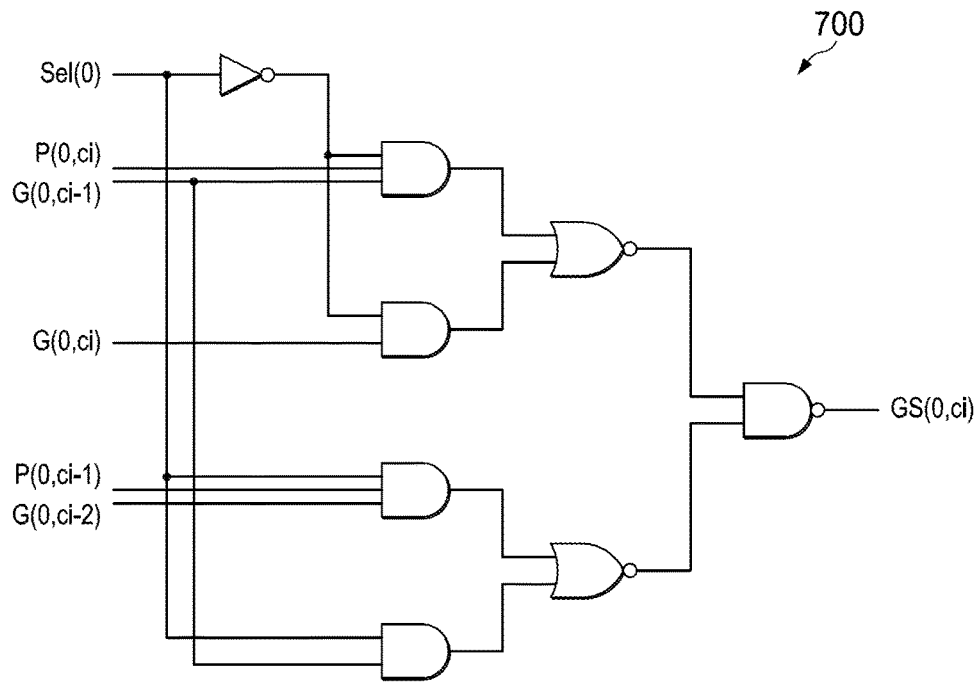
FIG. 7 illustrates a schematic diagram of the GS units in the first row of the 8-bit add-and-shift apparatus shown in FIG. 2 in accordance with various embodiments of the present disclosure.

FIG. 7 illustrates a schematic diagram of the GS units in the first row of the 8-bit add-and-shift apparatus shown in FIG. 2 in accordance with various embodiments of the present disclosure. The schematic diagram of the GS unit 700 is similar to that of the GS unit 600 shown in FIG. 6 except that the inputs of GS unit 700 are connected to P(0,ci), G(0,ci-1), G(0,ci), P(0,ci-1) and G(0,ci-2) respectively. It should be noted that P(0,ci), G(0,ci-1), G(0,ci), P(0,ci-1) and G(0,ci-2) are generated by the Propagate and Generate cells shown in FIG. 3.

Figure 8:
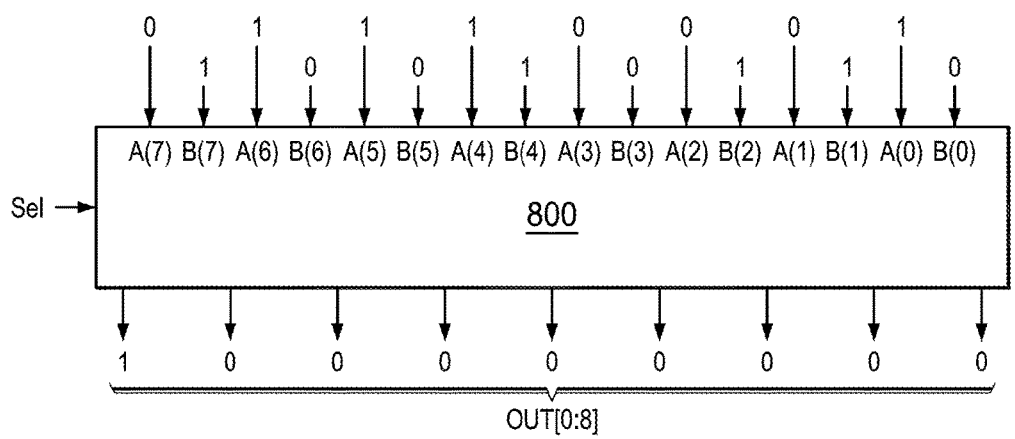
FIG. 8 illustrates a subtraction process of two aligned matissas in accordance with various embodiments of the present disclosure.

FIG. 8 illustrates a subtraction process of two aligned matissas in accordance with various embodiments of the present disclosure. Two aligned matissas are fed into an 8-bit add-and-shift apparatus 800 similar to that shown in FIG. 2. The aligned matissas are two unsigned numbers A and B, each of which has 8 bits ranging from bit 0 to bit 7.

The shifting value of this subtraction process is provided by the control signal Sel. In some embodiments, Sel is generated by a LZA/LZD unit (not shown).

In the subtraction operation, a first number is equal to 01110001 in binary format. A second number is equal to 01101001 in binary format. The subtraction process can be implemented by inverting all bits of the second number to obtain the complement B, which is 10010110 in binary format. Then, A, the complement B and one are added together to obtain the difference of the first number and the second number.

In the example above, the complement is equal to 10010110 in binary format. The sum of A, the complement and 1 is equal to 000010000 in binary format. The LZA/LZD unit (not shown) provides the control signal Sel indicating the result should be shifted to left by five bits. As a result, the output of the 8-bit add-and-shift apparatus 800 is equal to 100000000 in binary format.

Figure 9:
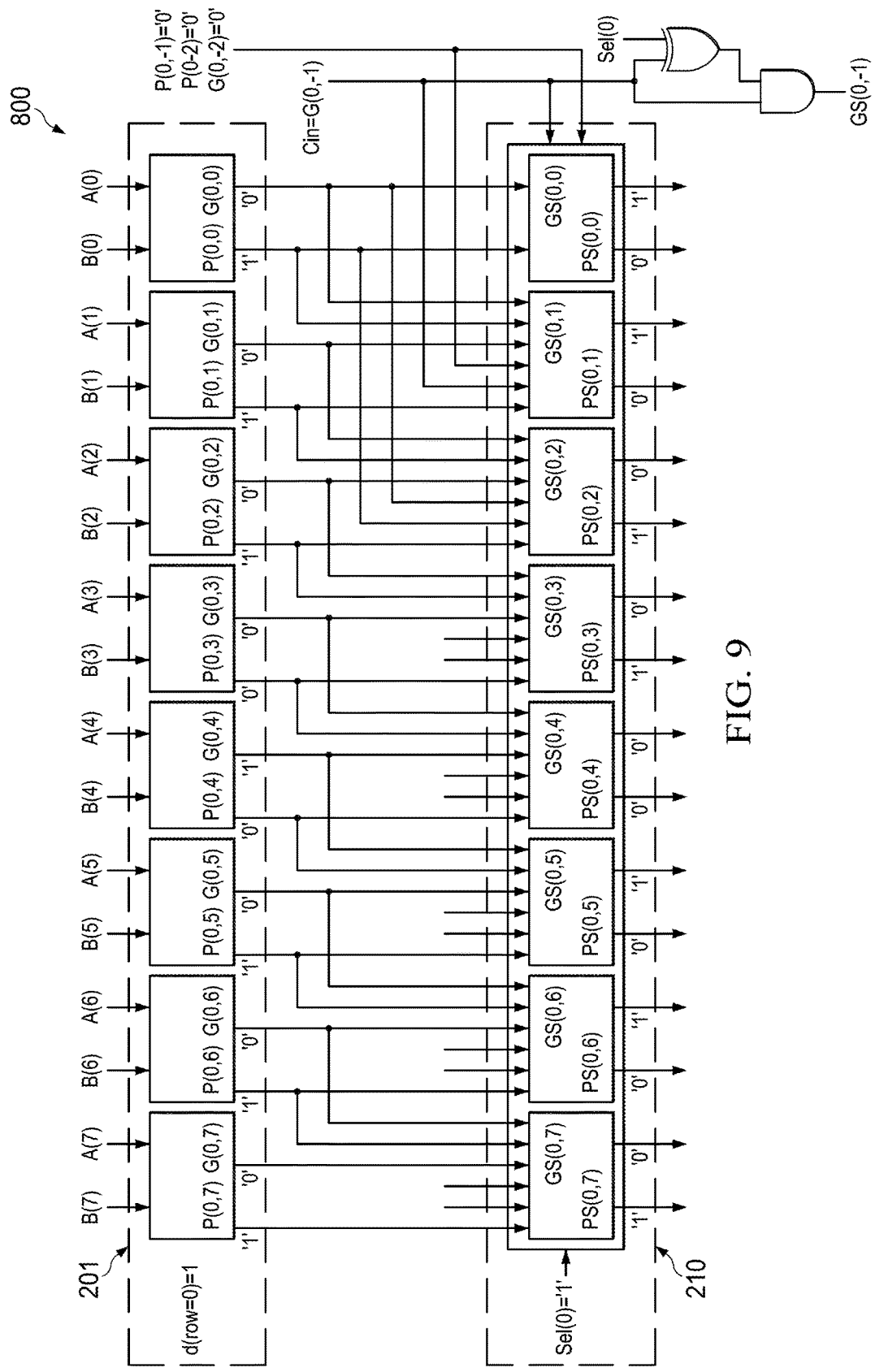
FIG. 9 illustrates a schematic diagram of a first row of the 8-bit add-and-shift apparatus shown in FIG. 8 in accordance with various embodiments of the present disclosure.

FIG. 9 illustrates a schematic diagram of a first row of the 8-bit add-and-shift apparatus shown in FIG. 8 in accordance with various embodiments of the present disclosure. Row 201 includes eight Propagate and Generate cells, each of which comprises two inputs coupled to two corresponding bits of the two unsigned 8-bit numbers A and B. The unsigned 8-bit numbers A and B are processed by the AND gate 302 and XOR gate 304 shown in FIG. 3. The output of Propagate cells is 11100111 in binary format as shown in FIG. 9. The output of Generate cells is 00010000 in binary format as shown in FIG. 9.

Row 210 comprises eight cells. Each cell includes a PS unit and a GS unit. Each cell has three groups of inputs. The row index of row 210 is equal to 0 as shown in FIG. 9. Referring back to Equation (3), the variable d of the row 210 is equal to 1. In other words, three groups of inputs are connected to a preceding cell in row 201, a cell that is one cell away from the preceding cell and a cell that is two cells away from the preceding cell.

For example, the cell of GS(0,2) and PS(0,2) has three groups of inputs. These three groups of inputs are connected to the outputs of the cell of P(0,2) and G(0,2), the cell of P(0,1) and G(0,1), and the cell of P(0,0) and G(0,0) respectively. Furthermore, the cell of GS(0,0) and PS(0,0) has three groups of inputs. These three groups of inputs are connected to the outputs of the cell of P(0,0) and G(0,0), the cell of P(0,-1) and G(0,-1), and the cell of P(0,-2) and G(0,-2) respectively. As shown in FIG. 9, G(0,-1) is equal to Cin. P(0,-1), P(0,-2) and G(0,-2) are set to 0 as shown in FIG. 9.

The eight cells in the row 210 receive a first bit (bit 0) of the control signal Sel, which is equal to 1 as shown in FIG. 9. The input signals of the eight cells in the row 210 are processed by the logic gates shown in FIGS. 5 and 7. The output of the PS units is 10001100 in binary format as shown in FIG. 9. The output of the GS units is 01100011 in binary format as shown in FIG. 9.

Figure 10:
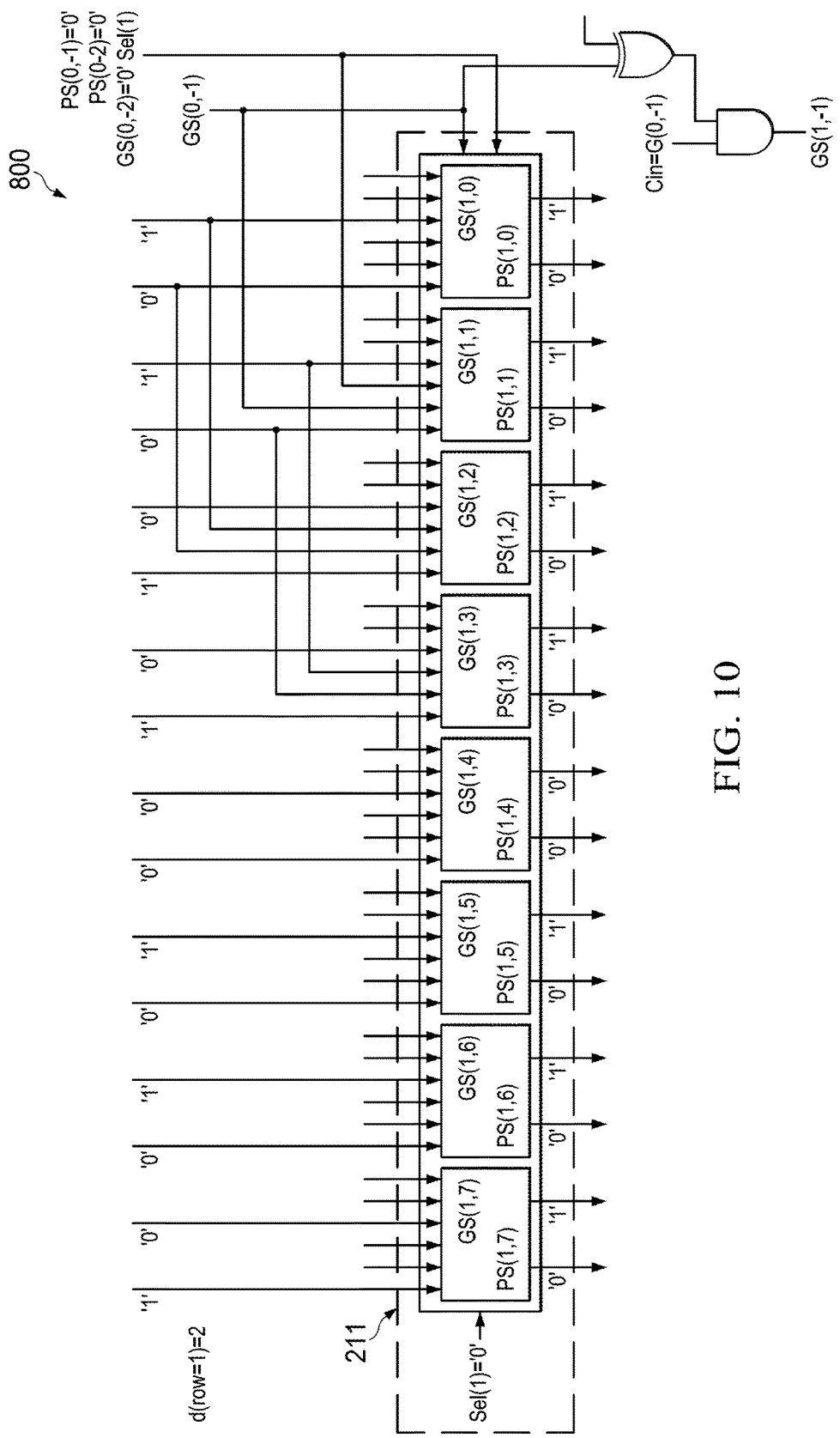
FIG. 10 illustrates a schematic diagram of a second row of the 8-bit add-and-shift apparatus shown in FIG. 8 in accordance with various embodiments of the present disclosure.

FIG. 10 illustrates a schematic diagram of a second row of the 8-bit add-and-shift apparatus shown in FIG. 8 in accordance with various embodiments of the present disclosure. Row 211 comprises eight cells. Each cell includes a PS unit and a GS unit. Each cell has three groups of inputs. The row index of row 211 is equal to 1. Referring back to Equation (3), the variable d of the row 211 is equal to 2 as shown in FIG. 10. In other words, three groups of inputs of each cell are connected to a preceding cell in row 210, a cell that is two cells away from the preceding cell and a cell that is four cells away from the preceding cell. For example, the cell of GS(1,1) and PS(1,1) has three groups of inputs. These three groups of inputs are connected to the outputs of the cell of PS(0,1) and GS(0,1), the cell of PS(0,-1) and GS(0,-1), and the cell of PS(0,-3) and GS(0,-3) respectively. Referring back to FIG. 9, GS(0,-1) is generated from G(0,-1) and Sel(0). PS(0,-1), PS(0,-3) and GS(0,-3) are set to 0 as shown in FIG. 10.

The eight cells in the row 211 receive a second bit (bit 1) of the control signal Sel, which is equal to 0 as shown in FIG. 10. The input signals of the eight cells in the row 211 are processed by the logic gates shown in FIGS. 4 and 6. The output of the PS units is 00000000 in binary format as shown in FIG. 10. The output of the GS units is 11101111 in binary format as shown in FIG. 10.

Figure 11:
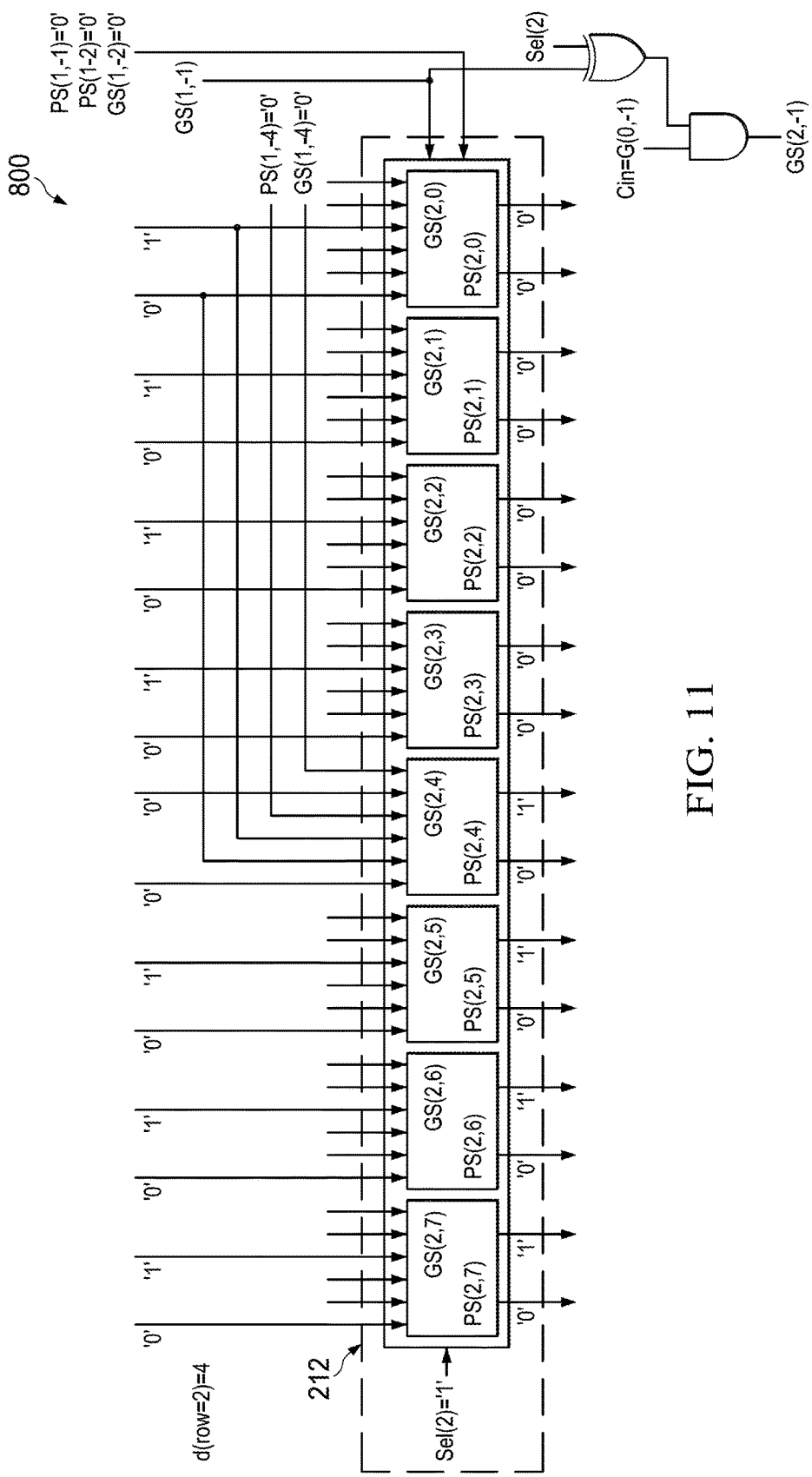
FIG. 11 illustrates a schematic diagram of a third row of the 8-bit add-and-shift apparatus shown in FIG. 8 in accordance with various embodiments of the present disclosure.

FIG. 11 illustrates a schematic diagram of a third row of the 8-bit add-and-shift apparatus shown in FIG. 8 in accordance with various embodiments of the present disclosure. Row 212 comprises eight cells. Each cell includes a PS unit and a GS unit. Each cell has three groups of inputs. The row index of row 212 is equal to 2. Referring back to Equation (3), the variable d of the row 212 is equal to 4 as shown in FIG. 11. In other words, three groups of inputs of each cell are connected to a preceding cell in row 211, a cell that is four cells away from the preceding cell and a cell that is eight cells away from the preceding cell. For example, the cell of GS(2,4) and PS(2,4) has three groups of inputs. These three groups of inputs are connected to the outputs of the cell of PS(1,4) and GS(1,4), the cell of PS(1,0) and GS(1,0), and the cell of PS(1,-4) and GS(1,-4) respectively. PS(1,-4) and GS(1,-4) are set to 0 as shown in FIG. 11.

The eight cells in the row 212 receive a third bit (bit 2) of the control signal Sel, which is equal to 1 as shown in FIG. 11. The input signals of the eight cells in the row 212 are processed by the logic gates shown in FIGS. 4 and 6. The output of the PS units is 00000000 in binary format as shown in FIG. 11. The output of the GS units is 11110000 in binary format as shown in FIG. 11.

Figure 12:
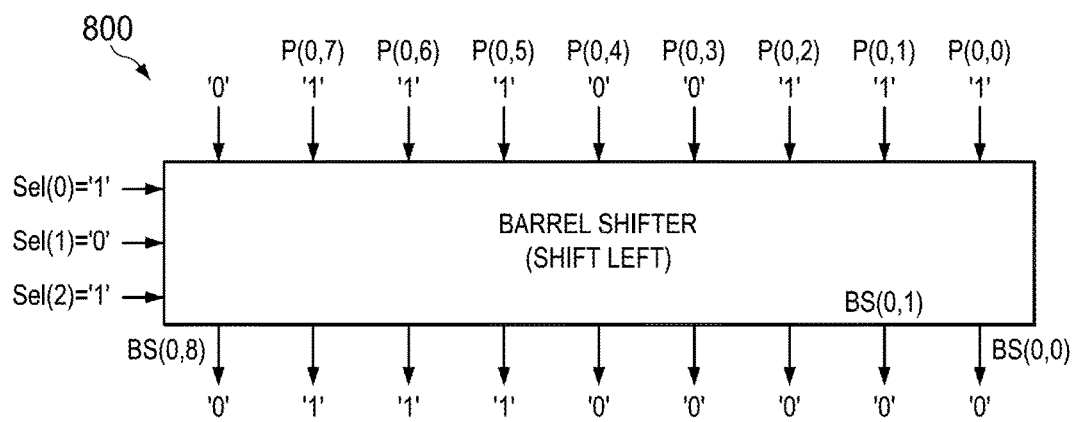
FIG. 12 illustrates a block diagram of a barrel shifter of the 8-bit add-and-shift apparatus shown in FIG. 8 in accordance with various embodiments of the present disclosure.

FIG. 12 illustrates a block diagram of a barrel shifter of the 8-bit add-and-shift apparatus shown in FIG. 8 in accordance with various embodiments of the present disclosure. The barrel shifter has eight inputs connected to 8 bits of the Propagate cells and an input configured to receive '0' as shown in FIG. 12. The barrel shifter further receives the control signal Sel, which is equal to 101 in binary format. The control signal Sel indicates the input binary number of the barrel shifter should be shifted to left by five bits. As shown in FIG. 12, the output binary number is 011100000 after shifting the input binary number 011100111 to left by five bits.

Figure 13:
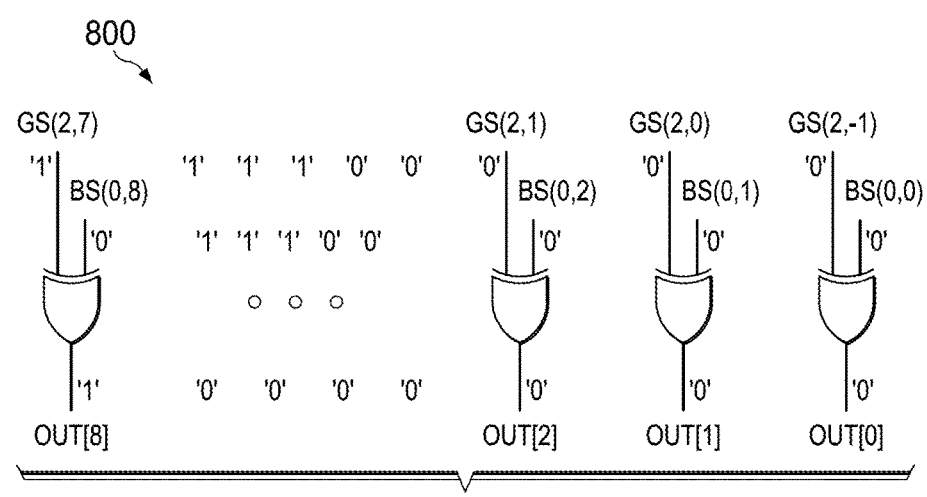
FIG. 13 illustrates a schematic diagram of an output block of the 8-bit add-and-shift apparatus shown in FIG. 8 in accordance with various embodiments of the present disclosure.

FIG. 13 illustrates a schematic diagram of an output block of the 8-bit add-and-shift apparatus shown in FIG. 8 in accordance with various embodiments of the present disclosure. The output block comprises nine exclusive OR (XOR) gates. As shown in FIG. 13, a first XOR gate has a first input connected to a first output of the barrel shifter shown in FIG. 12 and a second input connected to GS(2,-1). Referring back to FIG. 11, GS(2,-1) is generated by a logic circuit comprising a plurality of logic gates receiving input signals from GS(1,-1), G(0,-1) and Sel(2).

The other XOR gates of the output block have a first input connected to an output of a GS unit of a preceding cell in row 212 and a second input connected to a corresponding bit at the output of the barrel shifter. The output of the output block is 100000000 in binary format.

Figure 14:
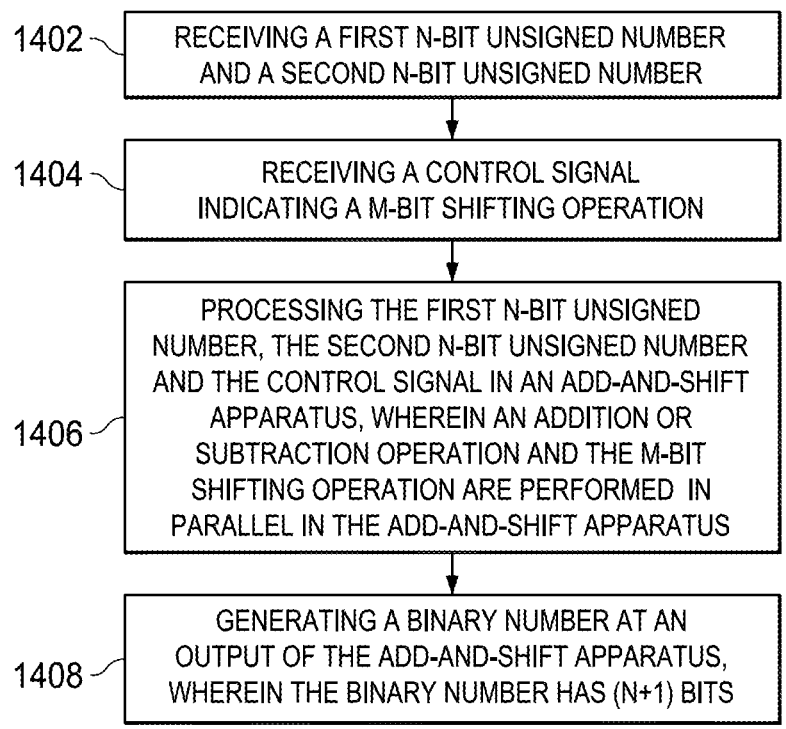
FIG. 14 illustrates a flow chart of an arithmetic operation in accordance with various embodiments of the present disclosure.

FIG. 14 illustrates a flow chart of an arithmetic operation in accordance with various embodiments of the present disclosure. At step 1402, receiving a first N-bit unsigned number and a second N-bit unsigned number. At step 1404, receiving a control signal indicating a m-bit shifting operation. At step 1406, processing the first N-bit unsigned number, the second N-bit unsigned number and the control signal in an add-and-shift apparatus, wherein an addition or subtraction operation and the m-bit shifting operation are performed in parallel in the add-and-shift apparatus. At step 1408, generating a binary number at an output of the add-and-shift apparatus, wherein the binary number has (N+1) bits.

The add-and-shift apparatus comprises an input block configured to receive a first N-bit unsigned number and a second N-bit unsigned number, wherein the input block comprises N propagate and generate cells, a plurality of calculation cells arranged in rows and columns, wherein the number of the columns is equal to N and the number of the rows is equal to $\log_2^{(N)}$, wherein each row has N cells and has an index ri, and wherein a variable d is equal to $2^{ri}$, and wherein each calculation cell has three groups of inputs connected to three cells in a preceding row, and wherein a first group of inputs are connected to outputs of a first calculation cell in the preceding row and vertically aligned with the calculation cell, a second group of inputs are connected to outputs of a second calculation cell that is d cells away from the first calculation cell and a third group of inputs are connected to outputs of a third calculation cell that is 2d cells away from the first calculation cell and an output block comprising a plurality of XOR gates.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
an input block configured to receive a first N-bit unsigned number and a second N-bit unsigned number, wherein the input block comprises N propagate and generate cells;
a plurality of calculation cells arranged in rows and columns, wherein the number of the columns is equal to N and the number of the rows is equal to log2(N), wherein each row has N cells and has an index ri, and wherein a variable d is equal to 2ri, and wherein each calculation cell has three groups of inputs connected to three cells in a preceding row, and wherein:

a first group of inputs are connected to outputs of a first calculation cell in the preceding row and vertically aligned with the calculation cell;
a second group of inputs are connected to outputs of a second calculation cell that is d cells away from the first calculation cell; and
a third group of inputs are connected to outputs of a third calculation cell that is 2d cells away from the first calculation cell; and
an output block comprising a plurality of XOR gates.

2. The apparatus of claim 1, wherein:
the propagate and generate cell comprises an AND gate and a XOR gate, wherein:
a first input of the AND gate is connected to a first input of the XOR gate; and
a second input of the AND gate is connected to a second input of the XOR gate.

3. The apparatus of claim 1, wherein:
the calculation cell comprises a propagate and shift (PS) unit and a generate and shift (GS) unit.

4. The apparatus of claim 3, wherein:
the PS unit comprises an NOT gate, a first AND gate, a second AND gate and an OR gate, and wherein:
the NOT gate is configured to receive a control signal;
the first AND gate has a first input connected to an output of the NOT gate, a second input configured to receive an output signal from a PS unit of the first calculation cell and a third input configured to receive an output signal from a PS unit of the second calculation cell;
the second AND gate has a first input configured to receive the control signal, a second input configured to receive the output signal from the PS unit of the second calculation cell and a third input configured to receive an output signal from a PS unit of the third calculation cell; and
the OR gate has a first input connected to an output of the first AND gate and a second input connected to an output of the second AND gate.

5. The apparatus of claim 3, wherein:
the GS unit comprises an NOT gate, a first AND gate, a second AND gate, a third AND gate, a fourth AND gate, a first NOR gate, a second NOR gate and a NAND gate, and wherein:
the first NOR gate is connected to outputs of the first AND gate and the second AND gate;
the second NOR gate is connected to outputs of the third AND gate and the fourth AND gate; and
the NAND gate is connected to outputs of the first NOR gate and the second NOR gate.

6. The apparatus of claim 5, wherein:
the NOT gate is configured to receive a control signal;
the first AND gate has a first input connected to an output of the NOT gate, a second input configured to receive an output signal from a PS unit of the first calculation cell and a third input configured to receive an output signal from a GS unit of the second calculation cell;
the second AND gate has a first input connected to the output of the NOT gate and a second input configured to receive an output signal from a GS unit of the first calculation cell;
the third AND gate has a first input configured to receive the control signal, a second input configured to receive an output signal from a PS unit of the second calculation cell and a third input configured to receive an output signal from a GS unit of the third calculation cell; and the fourth AND gate has a first input configured to receive the control signal and a second input configured to receive the output signal from the GS unit of the second calculation cell.

7. The apparatus of claim 1, further comprising:
a barrel shifter configured to receive a control signal and a binary number, and shift the binary number to the left by a number of bits indicated by the control signal.

8. The apparatus of claim 7, wherein:
a XOR gate of the output block has a first input connected to an output of a GS unit of a last row of the calculation cells and a second input connected to a corresponding bit of an output of the barrel shifter.

9. The apparatus of claim 7, wherein:
the output of the barrel shifter has (N+1) bits.

10. The apparatus of claim 1, wherein:
the plurality of calculation cells are configured such that an addition/subtraction operation and a shifting process are applied in parallel to the first N-bit unsigned number and the second N-bit unsigned number.

11. A system comprising:
an input block configured to receive a first N-bit unsigned number, a second N-bit unsigned number and a control signal, wherein the input block comprises N propagate and generate cells;
a plurality of calculation cells arranged in rows and columns and coupled to the input block, wherein the calculation cells are configured to perform an add operation and a shifting operation based upon the control signal, and the add operation and the shifting operation are applied in parallel to the first N-bit unsigned number and the second N-bit unsigned number; and
an output block comprising a plurality of XOR gates coupled to a last row of the plurality of calculation cells.

12. The system of claim 11, wherein:
the number of the columns is equal to N; and
the number of the rows is equal to log2(N).

13. The system of claim 11, wherein:
each row has N cells and has an index ri, and wherein a variable d is equal to 2ri, and wherein each calculation cell has three groups of inputs connected to three cells in a preceding row, and wherein:
a first group of inputs are connected to outputs of a first calculation cell in the preceding row and vertically aligned with the calculation cell;
a second group of inputs are connected to outputs of a second calculation cell that is d cells away from the first calculation cell; and
a third group of inputs are connected to outputs of a third calculation cell that is 2d cells away from the first calculation cell.

14. The system of claim 11, wherein:
the shifting operation is determined by the control signal, and wherein the control signal is generated by a Leading Zero Anticipation/Leading Zero Detection unit.

15. A method comprising:
receiving a first N-bit unsigned number and a second N-bit unsigned number by an add-and-shift apparatus comprising an input block having N cells, a plurality of calculation cells connected to outputs of the input block, and an output block having a plurality of gates connected to outputs of the plurality of calculations cells;
receiving a control signal indicating a m-bit shifting operation; and processing the first N-bit unsigned number, the second N-bit unsigned number and the control signal in the add-and-shift apparatus, wherein an addition or subtraction operation and the m-bit shifting operation are performed in parallel in the add-and-shift apparatus.

16. The method of claim 15, wherein the add-and-shift apparatus comprises:

the input block configured to receive a first N-bit unsigned number and a second N-bit unsigned number, wherein the input block comprises N propagate and generate cells;

the plurality of calculation cells arranged in rows and columns, wherein the number of the columns is equal to N and the number of the rows is equal to log2(N), wherein each row has N cells and has an index ri, and wherein a variable d is equal to 2ri, and wherein each calculation cell has three groups of inputs connected to three cells in a preceding row, and wherein:

a first group of inputs are connected to outputs of a first calculation cell in the preceding row and vertically aligned with the calculation cell;

a second group of inputs are connected to outputs of a second calculation cell that is d cells away from the first calculation cell; and a third group of inputs are connected to outputs of a third calculation cell that is 2d cells away from the first calculation cell; and the output block comprising a plurality of XOR gates.

17. The method of claim 15, further comprising:

generating a binary number at an output of the add-and-shift apparatus, wherein the binary number has (N+1) bits.

18. The method of claim 15, further comprising:

receiving an initial carry indicating an arithmetic operation.

19. The method of claim 18, wherein:

in response to a subtraction operation, the initial carry is set to 1; and in response to an addition operation, the initial carry is set to 0.

20. The method of claim 15, further comprising:

generating the control signal by a Leading Zero Anticipation/Leading Zero Detection unit.

* * * * *